US010264110B2

(12) United States Patent
Fukuda

(10) Patent No.: US 10,264,110 B2
(45) Date of Patent: Apr. 16, 2019

(54) CORDLESS TELEPHONE DEVICE AND TELEPHONE DIRECTORY CONTROL METHOD

(71) Applicant: Panasonic Intellectual Property Management Co., Ltd., Osaka (JP)

(72) Inventor: Hikaru Fukuda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/124,312

(22) PCT Filed: Mar. 5, 2015

(86) PCT No.: PCT/JP2015/001176
§ 371 (c)(1),
(2) Date: Sep. 7, 2016

(87) PCT Pub. No.: WO2015/155929
PCT Pub. Date: Oct. 15, 2015

(65) Prior Publication Data
US 2017/0019516 A1    Jan. 19, 2017

(30) Foreign Application Priority Data
Apr. 11, 2014  (JP) .................. 2014-082027

(51) Int. Cl.
*H04M 1/57* (2006.01)
*H04M 1/725* (2006.01)
*H04M 1/2745* (2006.01)

(52) U.S. Cl.
CPC ....... *H04M 1/576* (2013.01); *H04M 1/27455* (2013.01); *H04M 1/274508* (2013.01); *H04M 1/72502* (2013.01)

(58) Field of Classification Search
CPC .. H04M 1/57; H04M 1/575; H04M 1/274508; H04M 1/27455;
(Continued)

(56) References Cited

U.S. PATENT DOCUMENTS 5,592,538 A * 1/1997 Kosowsky ............. H04M 11/06
                                                    379/355.04
6,061,571 A   5/2000 Tamura
(Continued)

FOREIGN PATENT DOCUMENTS

EP    2 833 608 A1   2/2015
JP    2000-115296 A  4/2000
(Continued)

OTHER PUBLICATIONS

International Search Report dated Mar. 31, 2015, for corresponding International Application No. PCT/JP2015/001176, 4 pages.
(Continued)

*Primary Examiner* — Kamran Afshar
*Assistant Examiner* — Nicole M Louis-Fils
(74) *Attorney, Agent, or Firm* — Seed IP Law Group LLP

(57) ABSTRACT

Telephone directory data stored in storage unit (103) of a cordless telephone device of the present invention is data in which a telephone directory serial number, name information, telephone number information, and thumbnail image data are associated with each communication partner. With respect to telephone directory data, slave device transfer data transmitting unit (125) transmits only telephone directory serial number and thumbnail image data after conversion in association with each other, to the cordless phone slave device. In a case where there is an incoming call destined to a specific cordless phone slave device from a subscriber line, call control unit (121) transmits the telephone directory serial number, the name information, and the telephone
(Continued)

number information of the telephone directory data of a caller, together with incoming information, to the cordless phone slave device.

10 Claims, 12 Drawing Sheets

(58) Field of Classification Search
CPC ............ H04M 1/72502; H04M 1/576; H04M 1/72519; H04M 2207/18; H04M 3/42042; H04M 5/20; H04Q 3/72
USPC ........................................................ 455/415
See application file for complete search history.

(56) References Cited

U.S. PATENT DOCUMENTS

| | | | | |
|---|---|---|---|---|
| 7,085,257 B1* | 8/2006 | Karves | ............... | H04M 3/42093 370/352 |
| 2007/0066300 A1* | 3/2007 | Nishimura | ............. | G08C 17/02 455/426.1 |
| 2007/0081643 A1* | 4/2007 | Divine | ............... | H04M 1/72527 379/100.01 |
| 2009/0245488 A1* | 10/2009 | Mizuno | ............... | H04M 1/2478 379/93.06 |
| 2010/0027773 A1* | 2/2010 | Wallis | ............... | H04M 1/27455 379/201.01 |
| 2010/0283582 A1 | 11/2010 | Fujita et al. | | |
| 2015/0036671 A1 | 2/2015 | Fukuda et al. | | |

FOREIGN PATENT DOCUMENTS

| | | |
|---|---|---|
| JP | 2002-199082 A | 7/2002 |
| JP | 2003-101632 A | 4/2003 |
| JP | 2004-147242 A | 5/2004 |
| JP | 2004-228730 A | 8/2004 |
| JP | 2007-13876 A | 1/2007 |
| JP | 2010-283810 A | 12/2010 |
| JP | 5458209 B1 | 4/2014 |

OTHER PUBLICATIONS

Extended European Search Report, dated Apr. 26, 2017, for corresponding European Application No. 15776177.6-1972 / 3131272, 8 pages.
Communication pursuant to Article 94(3) EPC dated Jun. 15, 2018 for the related European Patent Application No. 15776177.6.

* cited by examiner

CORDLESS TELEPHONE DEVICE AND TELEPHONE DIRECTORY CONTROL METHOD

TECHNICAL FIELD

The present invention relates to a cordless telephone device, and a telephone directory control method of the cordless telephone device.

BACKGROUND ART

In recent years, a mobile phone has been widely spread which is equipped with a liquid crystal device capable of displaying high-precision image data. In such a mobile phone, during telephone directory calling, during an incoming call, or during talking on the phone, it has become common to display a thumbnail image, together with name information and telephone number information of a communication partner.

In addition, there is a desire to use telephone directory data including thumbnail image data which is used in a mobile phone, even in a cordless phone that is used in home. Here, the telephone directory data employs a data structure including a plurality of records, with a data set including at least name information, telephone number information, and thumbnail image data of a communication partner as a single record (a data unit to be managed). Information such as the nationality, the address, the e-mail address, the affiliation company and the date of birth of the communication partner, in addition to the name information, the telephone number information, and the thumbnail image data, may be included in the record information of the telephone directory data.

In PTL 1, a telephone directory data transfer system is described in which a mobile phone and an extension telephone (or a general subscriber phone) are coupled and can transfer telephone directory data to each other.

CITATION LIST

Patent Literature

PTL 1: Japanese Patent Unexamined Publication No. 2003-101632

SUMMARY OF THE INVENTION

In a cordless telephone device including a plurality of slave devices and a master device thereof, the master device stores and manages telephone directory data, and for example, every time there is an incoming call having a caller number from a subscriber line, telephone directory data that matches the received caller number is transmitted from the master device to the slave device, and name, phone number, and the like of the caller is displayed as incoming information on a display unit of the slave device.

However, if the thumbnail image data (partner image data) of the telephone directory data is included in the incoming information displayed on the slave device, the master device transmits thumbnail image data having a larger data amount as compared to text format data of the name information and the telephone number information of the telephone directory data, such that it takes long time until the completion of data transmission from the master device to the slave device, and a delay occurs in operations performed up to display of the telephone directory data on the slave device after there is an incoming call.

In addition, when the size of the thumbnail image data that is stored in the master device is different from the size of the thumbnail image data that is displayed on the display unit of the slave device, it is necessary to convert the thumbnail image data into a size corresponding to the display unit of the slave device and transmits the converted data to the slave device, and every time the thumbnail image data is displayed on the slave device, the master device converts the size of the thumbnail image data and transmits the converted thumbnail image data to the slave device, which leads to additional delay.

An object of the present invention is to provide a cordless telephone device and a telephone directory control method, in which it is possible to prevent the occurrence of a delay in operations performed up to display of telephone directory data including thumbnail image data on a slave device.

A cordless telephone device according to an aspect of the present invention is a cordless telephone device including at least one or more slave devices; and a master device thereof, the master device includes a first storage unit that stores telephone directory data including a plurality of records of a data set, with the data set including name information and telephone number information as a single record unit, and a first call control unit that in a case of displaying a predetermined data set of the telephone directory data on the slave device, transmits a message in which the data set which is a display target of the telephone directory data and record identification information for identifying the data set are edited, to the slave device, and the slave device includes a second storage unit that stores thumbnail image data associated with the record identification information of the telephone directory data stored in the master device, and a second call control unit that in a case of receiving the message from the master device, displays a data set which is included in the message, and thumbnail image data, which is stored in the second storage unit, corresponding to the record identification information of the message, in a predetermined display position.

A telephone directory control method according to another aspect of the present invention is a telephone directory control method of a cordless telephone device which includes at least one or more slave devices and a master device thereof, the telephone directory control method including storing telephone directory data including a data set including name information, and telephone number information, among telephone directory data including a plurality of records, with the data set including name information, telephone number information, and thumbnail image data as a record unit, in the master device; storing the record identification information associated with a data set of the telephone directory data stored in the master device, and the thumbnail image data in the slave device; in a case of displaying a predetermined data set of the telephone directory data on the slave device, transmitting a message in which the data set which is a display target of the telephone directory data and record identification information for identifying the data set are edited, to the slave device by the master device; and in a case of receiving the message from the master device, displaying a data set which is included in the message, and thumbnail image data, which is stored in the slave device, corresponding to the record identification information of the message, in a predetermined display position by the slave device.

According to the present invention, since in a cordless telephone device, a master device stores text data including name information and telephone number information and a slave device previously stores converted thumbnail image data that can be used in the slave device, every time the master device instructs a display unit of the slave device to display telephone directory data, there is no need that the master device converts the thumbnail image data and transmits the converted thumbnail image data to the slave device, such that when telephone directory data including thumbnail image data is displayed on the slave device, it is possible to reduce data amount to be transmitted from the master device to the slave device, and it is possible to prevent the occurrence of a delay in operations performed up to display of the telephone directory data including the thumbnail image data on the slave device.

DESCRIPTION OF EMBODIMENT

Hereinafter, the exemplary embodiment of the present invention will be described in detail, with reference to the drawings.

Exemplary Embodiment

Figure 1:
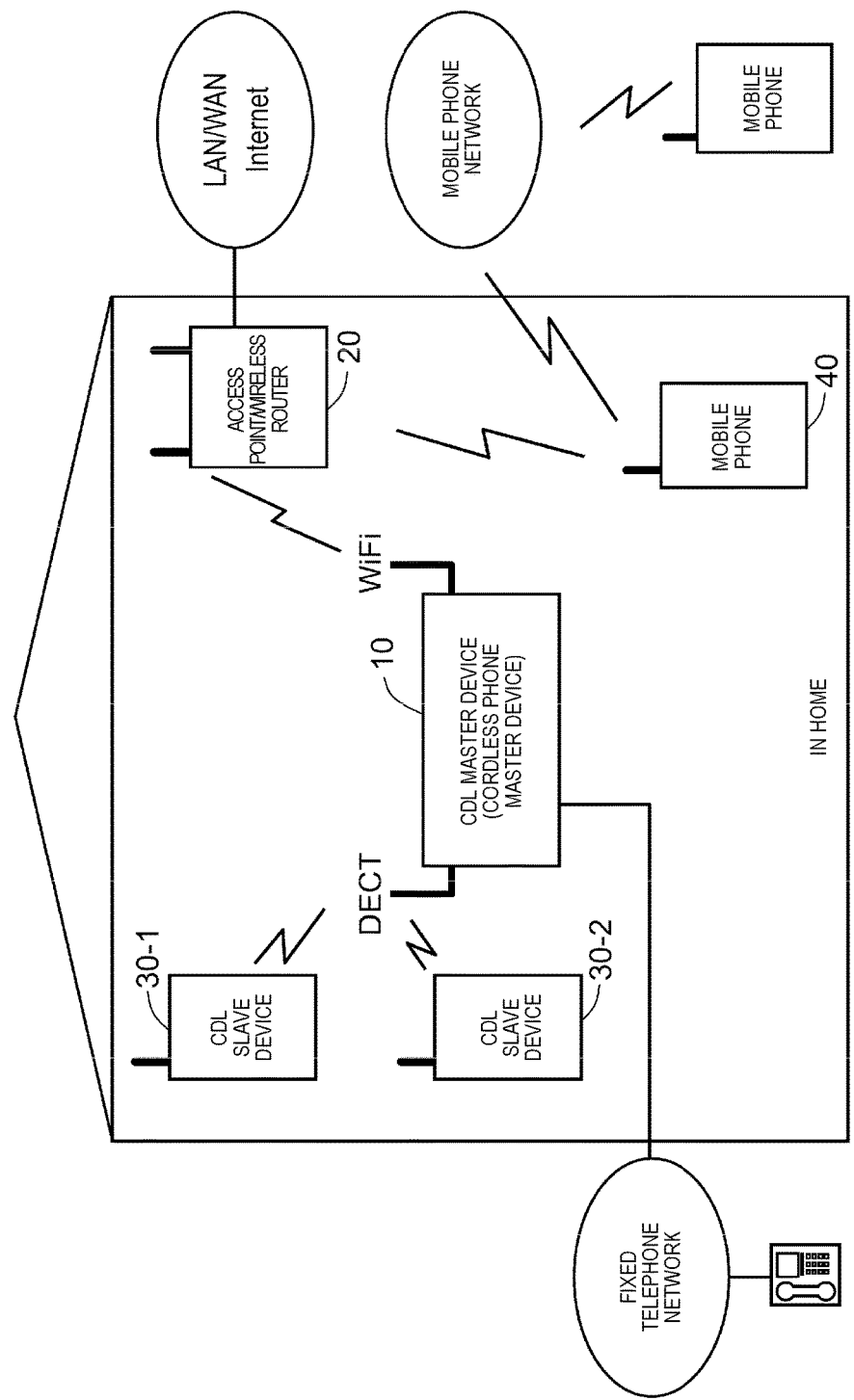
FIG. 1 is a schematic diagram illustrating a configuration of a cordless phone system according to an exemplary embodiment of the present invention.

FIG. 1 is a schematic diagram illustrating a configuration of a cordless phone system according to an exemplary embodiment of the present invention. Hereinafter, the configuration of the cordless phone system will be described with reference to FIG. 1. A wireless IP terminal is exemplified as a mobile phone such as a smart phone in the following description, but the present invention is not limited thereto.

In FIG. 1, cordless phone master device 10 is provided in home, and cordless phone master device 10 is connected to the Internet through access point 20, while being connected to a fixed telephone network. There are cordless phone slave devices (CDL slave devices) 30-1 and 30-2 which are connected to cordless phone master device 10, access point 20 having a wireless LAN router function, and mobile phone 40 connected to a mobile phone network, in home. If there is no distinction particularly, cordless phone slave devices are generally referred to as cordless phone slave device 30.

In FIG. 1, cordless phone slave device 30 is connectable to a fixed telephone network through cordless phone master device 10, and is connectable to mobile phone 40 through cordless phone master device 10 and access point 20. Mobile phone 40 is connected to cordless phone master device 10 and a wireless LAN through access point 20. Mobile phone 40 is connectable to cordless phone slave device 30 and the fixed telephone network, through access point 20 and cordless phone master device 10.

In FIG. 1, cordless phone slave device 30 employs a digital enhanced cordless telecommunications (DECT) system as a wireless communication system between the slave device and the master device, and cordless phone slave device 30 is connectable to the fixed telephone network and the mobile phone, through cordless phone master device 10. Mobile phone 40 is connectable to cordless phone slave device 30 and the fixed telephone network through cordless phone master device 10, and is also connectable to the Internet through access point 20.

Although FIG. 1 illustrates a case where mobile phone 40 is connected to cordless phone master device 10 through access point 20, cordless phone master device 10 is configured to have a wireless LAN repeater function, mobile phone 40 is directly connected to cordless phone master device 10, and can be connected to the Internet from cordless phone master device 10 through access point 20.

Figure 2:
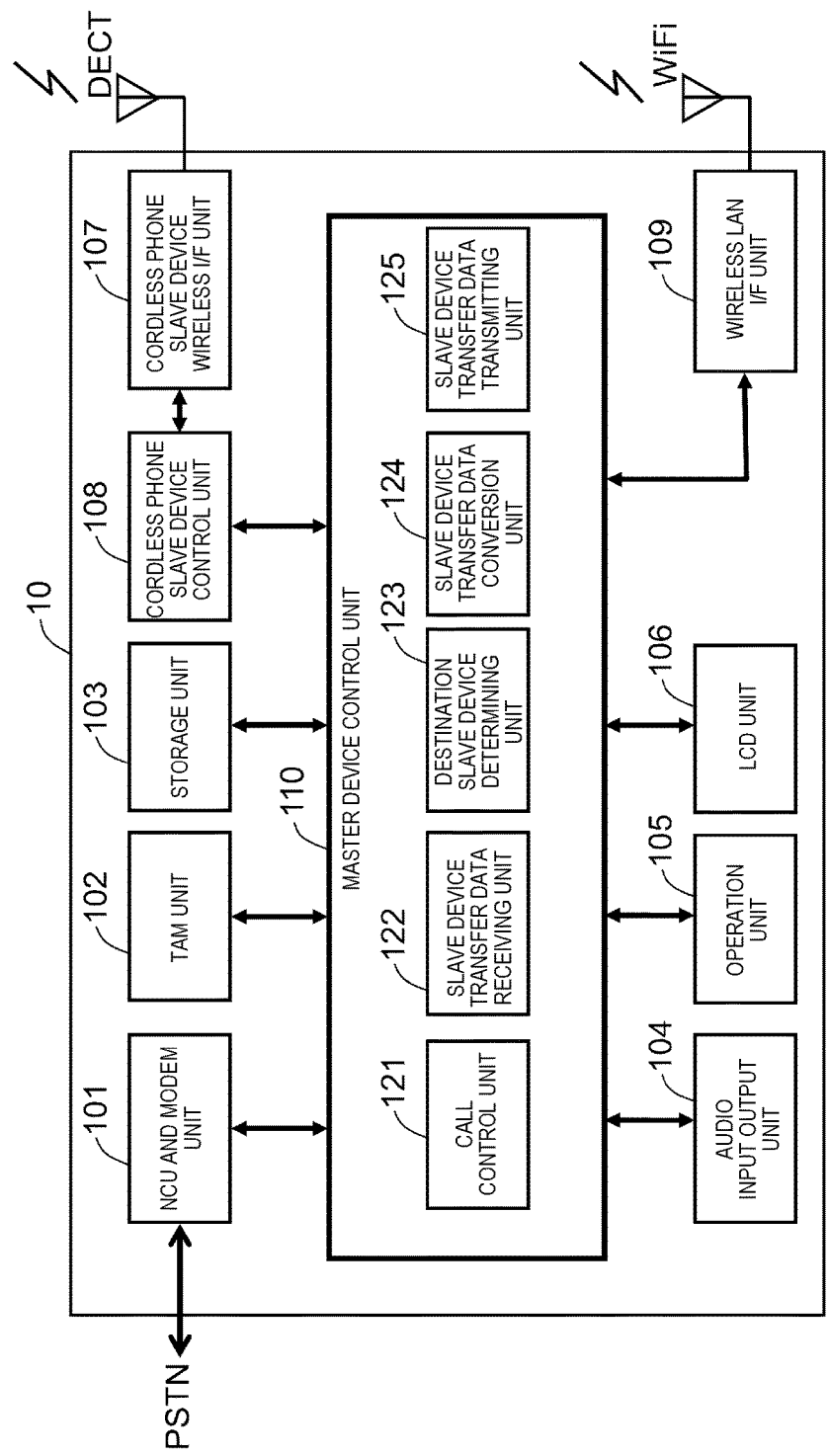
FIG. 2 is a block diagram illustrating a configuration of a cordless phone master device illustrated in FIG. 1.

FIG. 2 is a block diagram illustrating a configuration of cordless phone master device 10 illustrated in FIG. 1. Hereinafter, the configuration of cordless phone master device 10 will be described with reference to FIG. 2.

Network control unit (NCU) and modem unit 101 include a network control circuit (NCU) that controls a telephone line, such as detection of connection with a public line during calling and incoming call detection from the public line, and a modem unit that receives caller number information from the public line during incoming call.

Telephone answering machine (TAM) unit 102 stores an answering machine message, and performs the recording and playback of the messages.

Storage unit 103 stores various types of setting data of the cordless phone device, telephone directory data, call history information, and slave device additional information including communication history of the slave device such as an SMS message. With respect to the cordless phone device, there are a case of providing telephone directory data for each cordless phone slave device 30, and a case of providing telephone directory data which is commonly used in all of cordless phone slave devices 30. Cordless phone master device 10 stores and manages at least one of telephone directory data provided for each of cordless phone slave devices 30 and telephone directory data which is commonly used in all of cordless phone slave devices 30.

In addition, the telephone directory data stored in storage unit 103 employs a data structure including a plurality of records, in which a data set including at least the name information and the telephone number information of a communication partner is a single record (a data unit to be managed). A telephone directory serial number (a record number (record identification information for identifying a data set) of telephone directory data) is assigned to each record. Cordless phone master device 10 accesses a designated data set, according to the telephone directory serial number, and is able to extract name information or the like. Cordless phone master device 10 is able to display name information of a partner during telephone directory calling or during incoming call, by storing the telephone directory data in storage unit 103, using it as the telephone directory data which is managed by itself (master device).

In addition, storage unit 103 stores slave device information. The slave device information is associated with each cordless phone slave device 30, a state of connection with each cordless phone slave device 30, slave device name, and slave device number (a slave device extension number or a port number) of each cordless phone slave device 30, wallpaper data information (such as an image format, the number of colors, and an image size) of the slave device, thumbnail image data information (such as an image format, the number of colors, and an image size), ringtone memory information (memory capacity or a play time) and use CODEC. The slave device name and the slave device number are used as slave device identification information for identifying a slave device.

Audio input and output unit 104 includes a microphone, a speaker and a CODEC, and performs the output of a ringtone and the input and output of call voice.

Operation unit 105 includes a dial for the user to perform an operation, and various function buttons, and liquid crystal display (LCD) unit 106 displays various types of information.

Cordless phone slave device wireless I/F unit 107 is a circuit for transmitting and receiving wireless data to and from cordless phone slave device 30, and includes an RF/IF unit that performs frequency conversion of a wireless signal, a modem unit that performs modulation and demodulation, and a digital signal processing circuit that performs a TDMA signal process.

Cordless phone slave device control unit 108 transmits and receives control data to and from cordless phone slave device 30, and performs protocol control such as making a call and receiving a call according to the control protocol between cordless phone slave device 30 and cordless phone master device 10 (for example, a DECT protocol system, a PHS protocol system, or the like). In the following description, it is assumed that the DECT system is employed for the control protocol between cordless phone slave device 30 and cordless phone master device 10.

Wireless LAN I/F unit 109 performs wireless LAN protocol control of IEEE 802.11 (Wi-Fi (registered trademark)), and transmits and receives wireless data to and from mobile phone 40. Incidentally, wireless LAN I/F unit 109 may use a short-range wireless communication technique such as Bluetooth (registered trademark) or ZigBee (registered trademark).

Master device control unit 110 controls entire cordless phone master device 10. Specifically, master device control unit 110 receives and analyzes the event and message, which are generated in respective units in the periphery of master device control unit 110, controls the state of incoming and outgoing calls and call connection, and gives an instruction to each unit. Master device control unit 110 includes call control unit 121, slave device transfer data receiving unit 122, destination slave device determining unit 123, slave device transfer data conversion unit 124, and slave device transfer data transmitting unit 125.

Call control unit 121 processes events and various messages which are received from NCU and modem unit 101 and cordless phone slave device control unit 108.

In particular, in a case where there is an incoming call in NCU and modem unit 101 from the subscriber line, call control unit 121 searches for telephone number information of telephone directory data that matches the received caller number received from the subscriber line, and transmits an incoming message having the telephone directory serial number (record number), the name information, and the telephone number information of a record belonging to the matched telephone number information assigned thereto, to cordless phone slave device 30.

In addition, when performing telephone directory calling by the user's operation of cordless phone slave device 30, call control unit 121 transmits a display message in which the display contents of the telephone directory data are edited in response to the user's operation, to cordless phone slave device 30.

Slave device transfer data receiving unit 122 receives slave device transfer data in which various types of data (wallpaper data, ringtone data, telephone directory data, and the like) which are stored in mobile phone 40 and destination slave device information are edited, and which gives an instruction to transfer various types of data to designated cordless phone slave device 30, through wireless LAN I/F unit 109, from mobile phone 40, and stores the received slave device transfer data in storage unit 103.

Destination slave device determining unit 123 extracts destination slave device information from the slave device transfer data stored in storage unit 103, and determines cordless phone slave device 30 which is the destination of the slave device transfer data, based on the slave device identification information (the slave device name, the slave device extension number, or the slave device port number) which is set in the destination slave device information.

Slave device transfer data conversion unit 124 executes a predetermined conversion process, based on the type of the slave device transfer data stored in storage unit 103. For example, in a case where the slave device transfer data is telephone directory data and includes thumbnail image data, slave device transfer data conversion unit 124 converts the size of the thumbnail image data into the size of the thumbnail image of cordless phone slave device 30 of the slave device information.

Slave device transfer data transmitting unit 125 transmits the slave device transfer data which is subjected to a conversion process by slave device transfer data conversion unit 124, to cordless phone slave device 30 selected by destination slave device determining unit 123, within a predetermined period after reception of the slave device transfer data from mobile phone 40, through cordless phone slave device wireless I/F unit 107. In addition, slave device transfer data transmitting unit 125 notifies mobile phone 40 of a message indicating that the conversion process cannot been executed, or a message indicating that the conversion process is executed.

In particular, in a case where thumbnail image data of the telephone directory data received from mobile phone 40 is transmitted to cordless phone slave device 30, slave device transfer data transmitting unit 125 transmits slave device transfer data in which the telephone directory serial number and the converted thumbnail image data are edited in association with each other, to cordless phone slave device 30.

Figure 3:
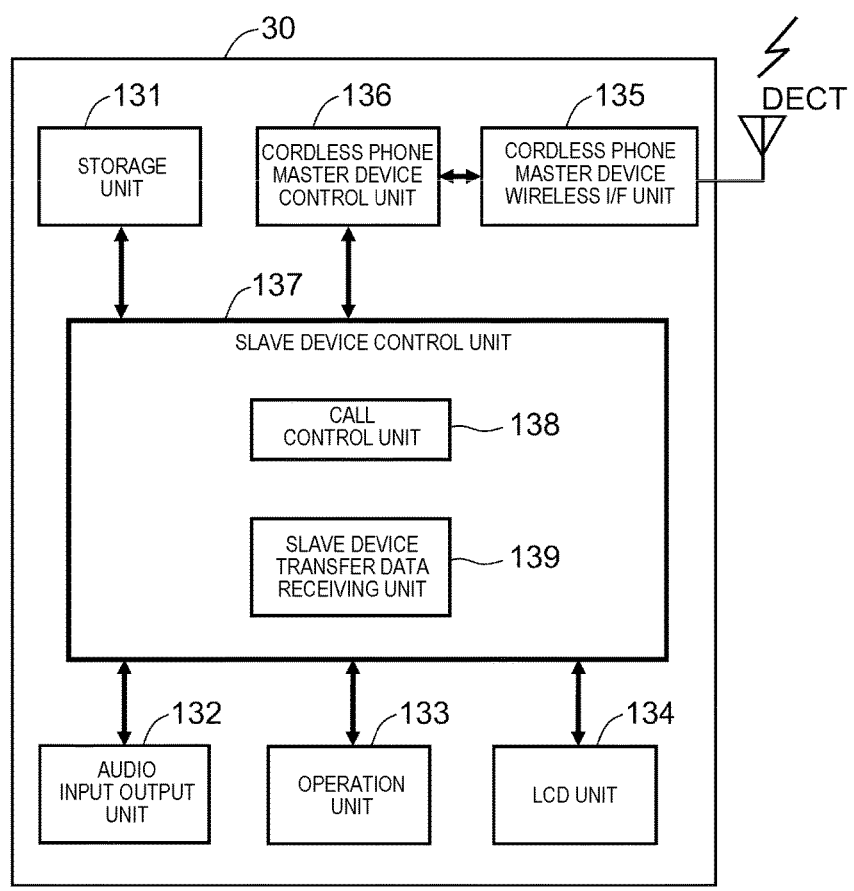
FIG. 3 is a block diagram illustrating a configuration of a cordless phone slave device illustrated in FIG. 1.

FIG. 3 is a block diagram illustrating a configuration of cordless phone slave device 30 illustrated in FIG. 1. Below, the configuration of cordless phone slave device 30 will be described with reference to FIG. 3.

Storage unit 131 stores various types of data which are used in cordless phone slave device 30, such as telephone directory data, in a predetermined storage area.

In addition, since the telephone directory serial number and the thumbnail image data are associated with each communication partner in the telephone directory data stored in storage unit 131, the thumbnail image data is stored in a format of being converted into the size of the thumbnail image of the slave device.

Audio input and output unit 132 includes a microphone, a speaker and a CODEC, and performs the output of a ringtone and the input and output of call voice.

Operation unit 133 includes a dial for the user to perform an operation, and various function buttons such as a telephone directory key to start a telephone directory function, and liquid crystal display (LCD) unit 134 displays various types of information.

Cordless phone master device wireless I/F unit 135 is a circuit for transmitting and receiving wireless data to and from cordless phone master device 10, and includes an RF/IF unit that performs frequency conversion of a wireless signal, a modem unit that performs modulation and demodulation, and a digital signal processing circuit that performs a TDMA signal process.

Cordless phone master device control unit 136 transmits and receives control data to and from cordless phone master device 10, and performs protocol control such as making a call and receiving a call according to the control protocol between cordless phone slave device 30 and cordless phone master device 10 (for example, a DECT protocol system, a PHS protocol system, or the like).

Slave device control unit 137 controls entire cordless phone slave device 30. Specifically, slave device control unit 137 receives and analyzes the event and the message which are generated in respective units in the periphery of slave device control unit 137, controls the state of incoming and outgoing calls and call connection, and gives an instruction to each unit. Slave device control unit 137 includes call control unit 138 and slave device transfer data receiving unit 139.

Call control unit 138 processes events and various messages which are received from operation unit 133 and cordless phone master device control unit 136.

In particular, when receiving an incoming message having the telephone directory serial number (record number), the name information and the telephone number information assigned thereto from cordless phone master device 10 during an incoming call to the subscriber line, call control unit 138 sounds a predetermined ringtone, extracts the telephone directory serial number, the name information and the telephone number information of the telephone directory data which are assigned to the incoming message, and reads the thumbnail image data of the telephone directory serial number from storage unit 131. Call control unit 138 displays the thumbnail image data, the name information and the telephone number information of the caller on LCD unit 134, as a display screen during incoming call.

In addition, call control unit 138 notifies cordless phone master device 10 of various types of key input information (a telephone directory key, a next page key, and the like) from operation unit 133, that the user performs for telephone directory calling.

In addition, if the user notifies cordless phone master device 10 of key information by pressing the telephone directory key or the next page key on operation unit 133, call control unit 138 receives a display message instructing screen display during telephone directory operation, from cordless phone master device 10, extracts the telephone directory serial number, the name information, and the telephone number information which are assigned to the display message, and reads out the thumbnail image data of each telephone directory serial number from storage unit 131. Call control unit 138 displays a telephone directory screen in which each piece of thumbnail image data, name information, and telephone number information are arranged in predetermined positions of LCD unit 134.

Slave device transfer data receiving unit 139 receives slave device transfer data from cordless phone master device 10 through cordless phone master device wireless IT unit 135, and stores the slave device transfer data in a predetermined storage area of storage unit 131 according to the type of the slave device transfer data.

In particular, when receiving the thumbnail image data of the telephone directory data, slave device transfer data receiving unit 139 associates and stores the received telephone directory serial number and the converted thumbnail image data in storage unit 131.

Figure 4:
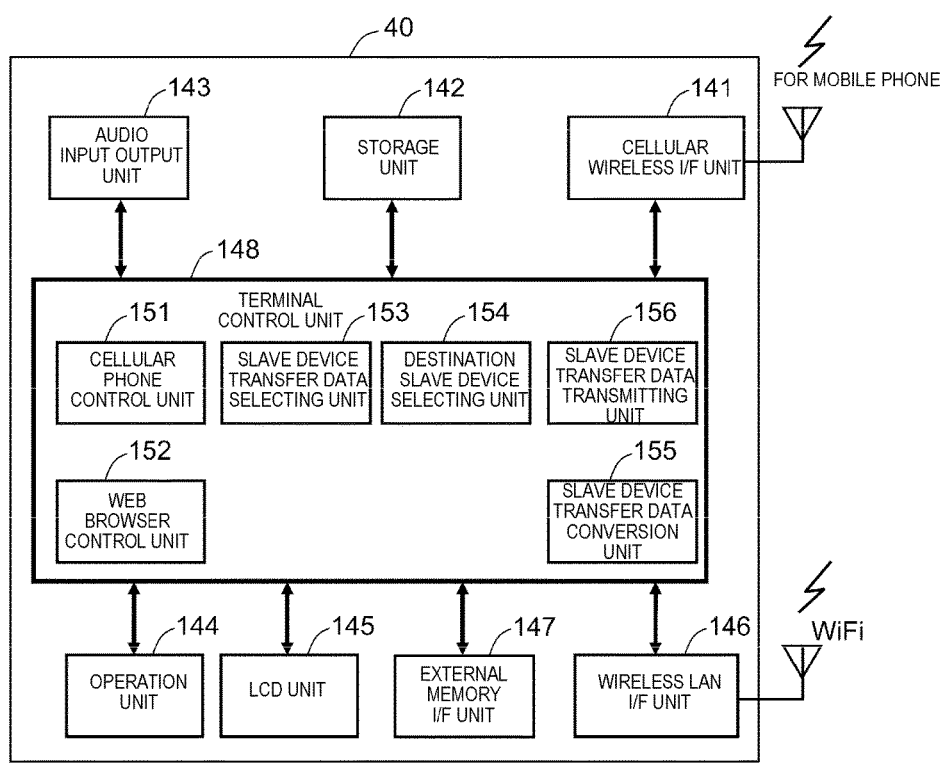
FIG. 4 is a block diagram illustrating a configuration of a mobile phone (a wireless IP terminal) illustrated in FIG. 1.

FIG. 4 is a block diagram illustrating a configuration of mobile phone 40 illustrated in FIG. 1. Below, a description will be given on the configuration of mobile phone 40 with reference to FIG. 4.

Cellular wireless I/F unit 141 performs wireless data transmission and reception with the mobile phone base station through a mobile phone antenna.

Storage unit 142 stores information such as various types of setting data, telephone directory data, call history information, SMS messages, various types of image data (including wallpaper data), music data (including ringtone data) of mobile phone 40.

In addition, in the telephone directory data stored in storage unit 142, the name information, the telephone number information and the thumbnail image data are associated with each communication partner, information such as an address, an e-mail address, an affiliation company, a date of birth may be included.

Audio input output unit 143 includes a microphone and a speaker, and performs the output of a ringtone and the input and output of call voice.

Operation unit 144 includes a dial for the user to perform an operation, and various function buttons, and LCD unit 145 displays various types of information. The touch panel of a smart phone or the like may form operation unit 144 and LCD unit 145.

Wireless LAN I/F unit 146 performs wireless LAN protocol control of IEEE802.11, and transmits and receives wireless data to and from cordless phone master device 10. Wireless LAN I/F unit 146 may use a short-range wireless communication technique such as Bluetooth (registered trademark) or ZigBee (registered trademark), corresponding to cordless phone master device 10.

External memory I/F unit 147 has a shape on which an external memory such as an SD card is detachably mountable, and reads/writes data to and from the mounted external memory.

Terminal control unit 148 controls entire mobile phone 40. Specifically, terminal control unit 148 receives and analyzes events and messages, which are generated in respective units in the periphery of terminal control unit 148, controls the state of incoming and outgoing calls and call connection, and gives an instruction to the respective units. Terminal control unit 148 includes cellular phone control unit 151, Web browser control unit 152, slave device transfer data selecting unit 153, destination slave device selecting unit 154, slave device transfer data conversion unit 155, and slave device transfer data transmitting unit 156.

Cellular telephone control unit 151 processes the call control message received from cellular wireless I/F unit 141.

Web browser control unit 152 downloads HTML files, image files, music files, and the like, from the Internet, through cellular wireless I/F unit 141 or wireless LAN I/F unit 146, and performs control so as to analyze, display and play the Web screen layout.

Slave device transfer data selecting unit 153 selects data (slave device transfer data) to be transferred to cordless phone slave device 30, from a data group (wallpaper data, ringtone data, telephone directory data, or the like) which is stored in storage unit 142, and outputs the selected data to slave device transfer data transmitting unit 156, based on the user's operation in operation unit 144 (including LCD unit 145).

Destination slave device selecting unit 154 selects cordless phone slave device 30 which is a data destination, and outputs selected cordless phone slave device 30 to slave device transfer data transmitting unit 156, based on the user's operation in operation unit 144 (including LCD unit 145). In addition, destination slave device selecting unit 154 can select a single or a plurality number of cordless phone slave devices 30.

Slave device transfer data conversion unit 155 performs a predetermined conversion process on the slave device transfer data which is output from slave device transfer data selecting unit 153, based on the type of the slave device transfer data. If the slave device transfer data is telephone directory data, slave device transfer data conversion unit 155 converts the size of the thumbnail image data of the slave device transfer data into the thumbnail size of cordless phone slave device 30.

Slave device transfer data transmitting unit 156 edits the slave device transfer data which is subjected to the conversion process by slave device transfer data conversion unit 155. Specifically, slave device transfer data transmitting unit 156 generates the header portion of the slave device transfer data, and sets destination slave device identification information (a slave device name, a slave device extension number, or a slave device port number) indicating cordless phone slave device 30 which is selected by destination slave device selecting unit 154 in the destination slave device information of the slave device transfer data message of the header portion. Then, slave device transfer data transmitting unit 156 transmits the edited slave device transfer data to cordless phone master device 10 through wireless LAN I/F unit 146.

Figure 5:
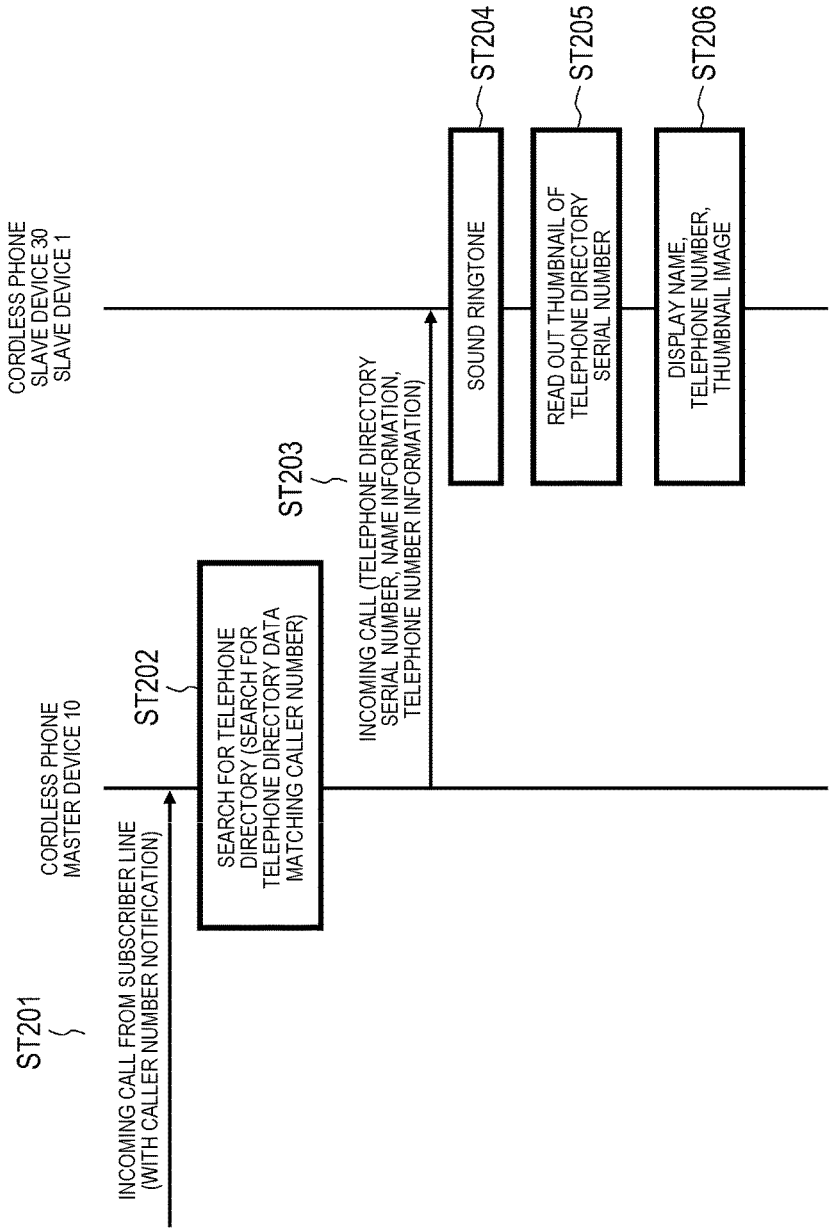
FIG. 5 is a sequence diagram illustrating a display processing procedure of telephone directory data during an incoming call.

Next, the display processing procedure of the telephone directory data during incoming call will be described with reference to the sequence diagram of FIG. 5.

In ST201, when there is an incoming call with a caller number notification from a subscriber line, if in cordless phone master device 10, NCU and modem unit 101 detect the incoming call and receive the caller number, call control unit 121 is notified of event information and the caller number of which incoming is detected. In ST202, call control unit 121 searches for the telephone directory data that matches the caller number.

In ST203, call control unit 121 transmits an incoming message in which the telephone directory serial number, the name information and the telephone number information of the telephone directory data matching the received caller number are edited, to cordless phone slave device 30 (slave device 1).

Cordless phone slave device 30, to which cordless phone master device 10 transmits an incoming message and notifies of an incoming call from a subscriber line, is not limited only to slave device 1, and may be a plurality of cordless phone slave devices 30 (slave devices 1 and 2) which are in connection with cordless phone master device 10. In addition, cordless phone master device 10 may send notification only to specific cordless phone slave device 30 in response to the received caller number.

If call control unit 138 receives the incoming message from cordless phone master device 10, cordless phone slave device 30 (slave device 1) sounds ringtone in ST204.

Further, in ST205, call control unit 138 of cordless phone slave device 30 (slave device 1) reads out the thumbnail image data corresponding to the received telephone directory serial number, from the telephone directory data which is stored in storage unit 131, based on the telephone directory serial number which is added to the incoming message. In ST206, call control unit 138 displays an incoming call display screen in which the thumbnail image data of the caller which is read from storage unit 131 and the name information and the telephone number information which are assigned to the incoming messages are arranged in a predetermined position of LCD unit 134.

Figure 6:
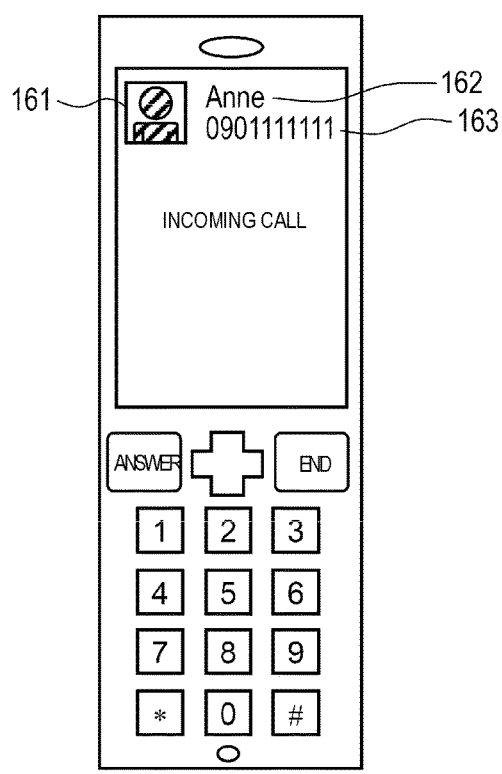
FIG. 6 is a diagram illustrating an example of a display screen of the cordless phone slave device illustrated in FIG. 3 during an incoming call.
Figure 7:
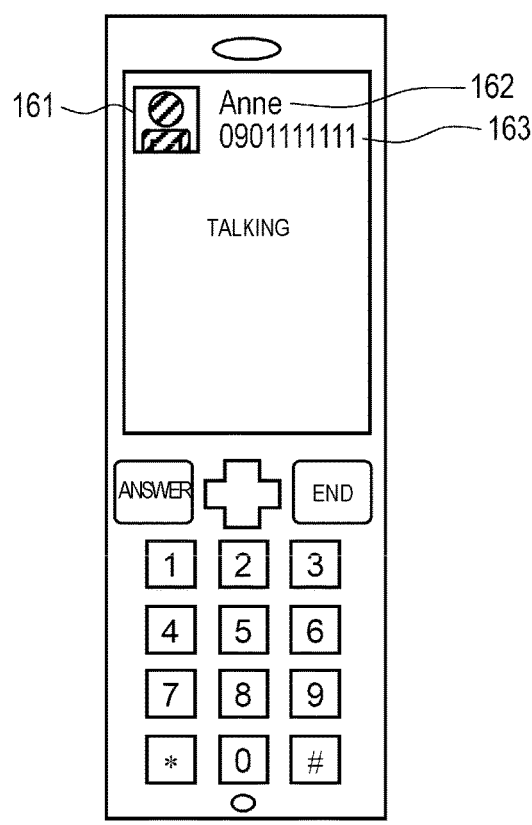
FIG. 7 is a diagram illustrating an example of a display screen of the cordless phone slave device illustrated in FIG. 3 during conversation over a phone.

FIG. 6 is a diagram illustrating an example of a display screen of cordless phone slave device 30 during incoming call. FIG. 7 is a diagram illustrating an example of a display screen of cordless phone slave device 30 during the conversation over the phone. As illustrated in FIG. 6 and FIG. 7, during incoming call or during the conversation over the phone, thumbnail image 161 of a communication partner, name information 162 of the communication partner, and telephone number information 163 of the communication partner are displayed on the screen of cordless phone slave device 30.

Figure 8:
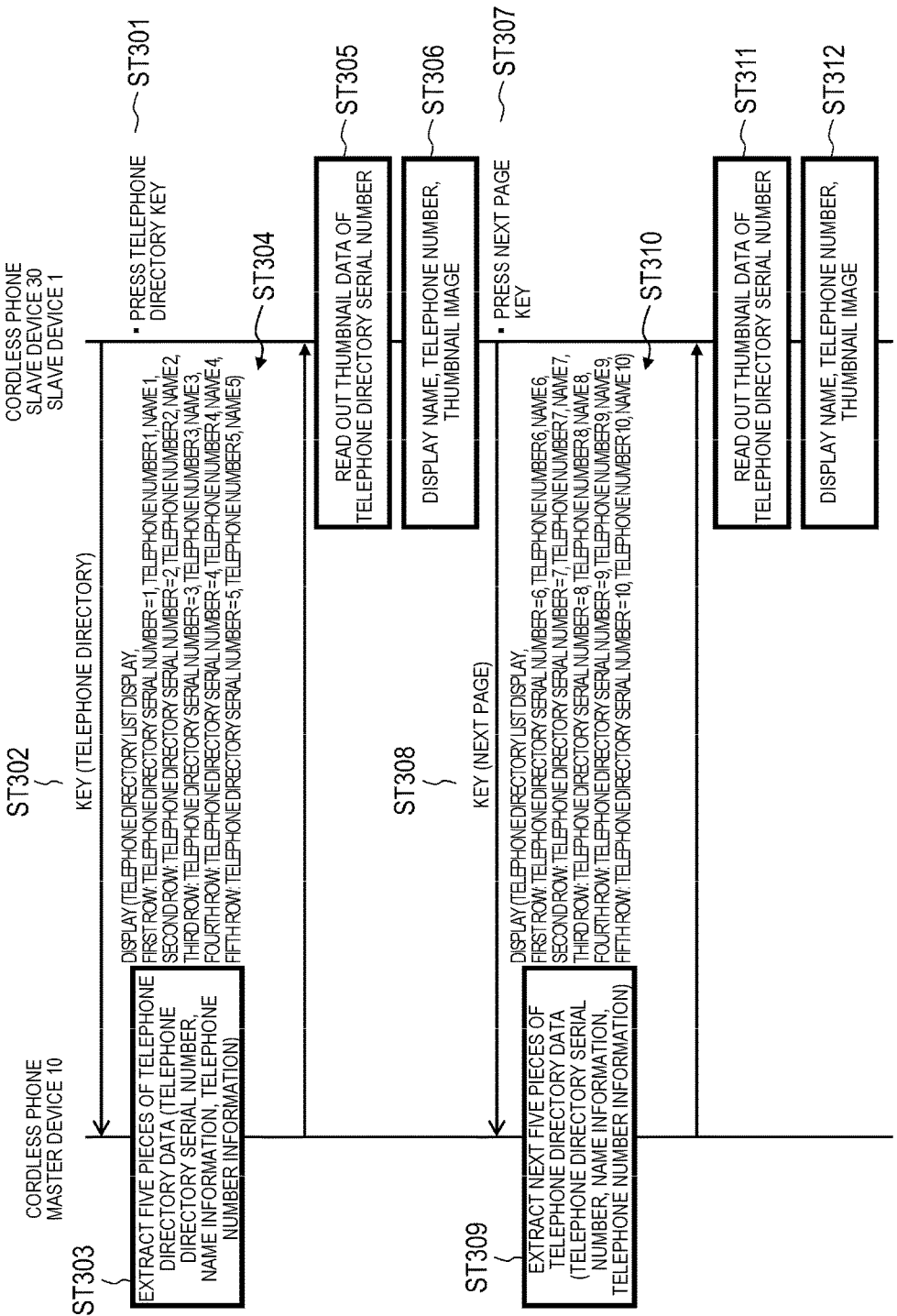
FIG. 8 is a sequence diagram illustrating a display processing procedure of telephone directory data during a telephone directory operation.

Next, a display processing procedure of telephone directory data during a telephone directory operation will be described with reference to the sequence diagram of FIG. 8.

If the user presses a telephone directory key provided in operation unit 133 in ST301, call control unit 138 of cordless phone slave device 30 (slave device 1) transmits key information (telephone directory) notifying of the start of a telephone directory function of making a call by referring to the telephone directory data in the master device, to cordless phone master device 10 in ST302.

Upon receipt of the key information (telephone directory), call control unit 121 of cordless phone master device 10 transmits a display message, which is initial screen information of a telephone directory, and in which the telephone directory serial numbers, the name information pieces and the telephone number information pieces of the telephone directory data pieces of telephone directory serial numbers of the first to a predetermined number n, to cordless phone slave device 30 (slave device 1), in ST303 and ST304.

Upon receipt of a predetermined number n of pieces of telephone directory data, call control unit 138 of cordless phone slave device 30 (slave device 1) reads out the thumbnail image data of the telephone directory serial number of each piece of telephone directory data from storage unit 131, in ST305. Cordless phone slave device 30 (slave device 1) displays an initial screen of the telephone directory in which the predetermined number n of pieces of thumbnail image data, name information and telephone number information are arranged in predetermined display positions, on LCD unit 134, in ST306.

Next, if the user presses a next page key in ST307, call control unit 138 transmits key information (next page) to cordless phone master device 10 in ST308.

Upon receipt of the key information (next page), call control unit 121 of cordless phone master device 10 transmits a display message in which the telephone directory serial number, the name information and the telephone number information of each of telephone directory data piece of the next number of the last telephone directory serial number which was transmitted in the previous time to a predetermined number n, to cordless phone slave device 30 (slave device 1), in ST309 and ST310.

Upon receipt of a display message to instruct the screen display of telephone directories of the next predetermined number n from cordless phone master device 10, call control unit 138 of cordless phone slave device 30 (slave device 1) reads out the thumbnail image data of the telephone directory serial number of each telephone directory data from storage unit 131 in ST311. Call control unit 138 displays a telephone directory screen in which the predetermined number n of pieces of thumbnail image data, name information and telephone number information are arranged in predetermined display positions, on LCD unit 134, in ST312.

Hereinafter, until the desired telephone directory data of the user is displayed, the process of ST307 to ST312 is repeated.

Figure 9:
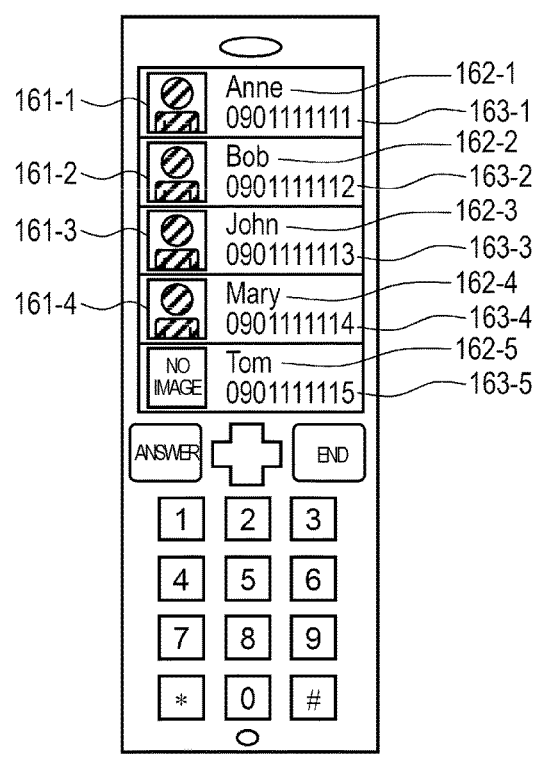
FIG. 9 is a diagram illustrating an example of a display screen of the cordless phone slave device illustrated in FIG. 3, during the telephone directory operation.

FIG. 9 is a diagram illustrating an example of the display screen of cordless phone slave device 30, during a telephone directory operation. As illustrated in FIG. 9, during a telephone directory operation, thumbnail images 161 of a predetermined number n (n=5 in FIG. 9) of candidates for communication partners, name information 162 of the communication partners, and telephone number information 163 of the communication partners are displayed on the screen of cordless phone slave device 30.

In this way, in the present exemplary embodiment, in advance, text information of name information and telephone number information of the telephone directory data is stored in storage unit 103 of the master device, and thumbnail image data which is image data is stored in storage unit 131 of cordless phone slave device 30. Thus, during incoming call, or during the telephone directory operation, when displaying the telephone directory data on the display unit of the slave device, it is possible to display the telephone directory data on cordless phone slave device 30, without transmitting the thumbnail image data which is image data from cordless phone master device 10 to cordless phone slave device 30. Accordingly, it is possible to prevent the occurrence of a delay in operations performed up to display of the telephone directory data including the thumbnail image data on the slave device.

Figure 10:
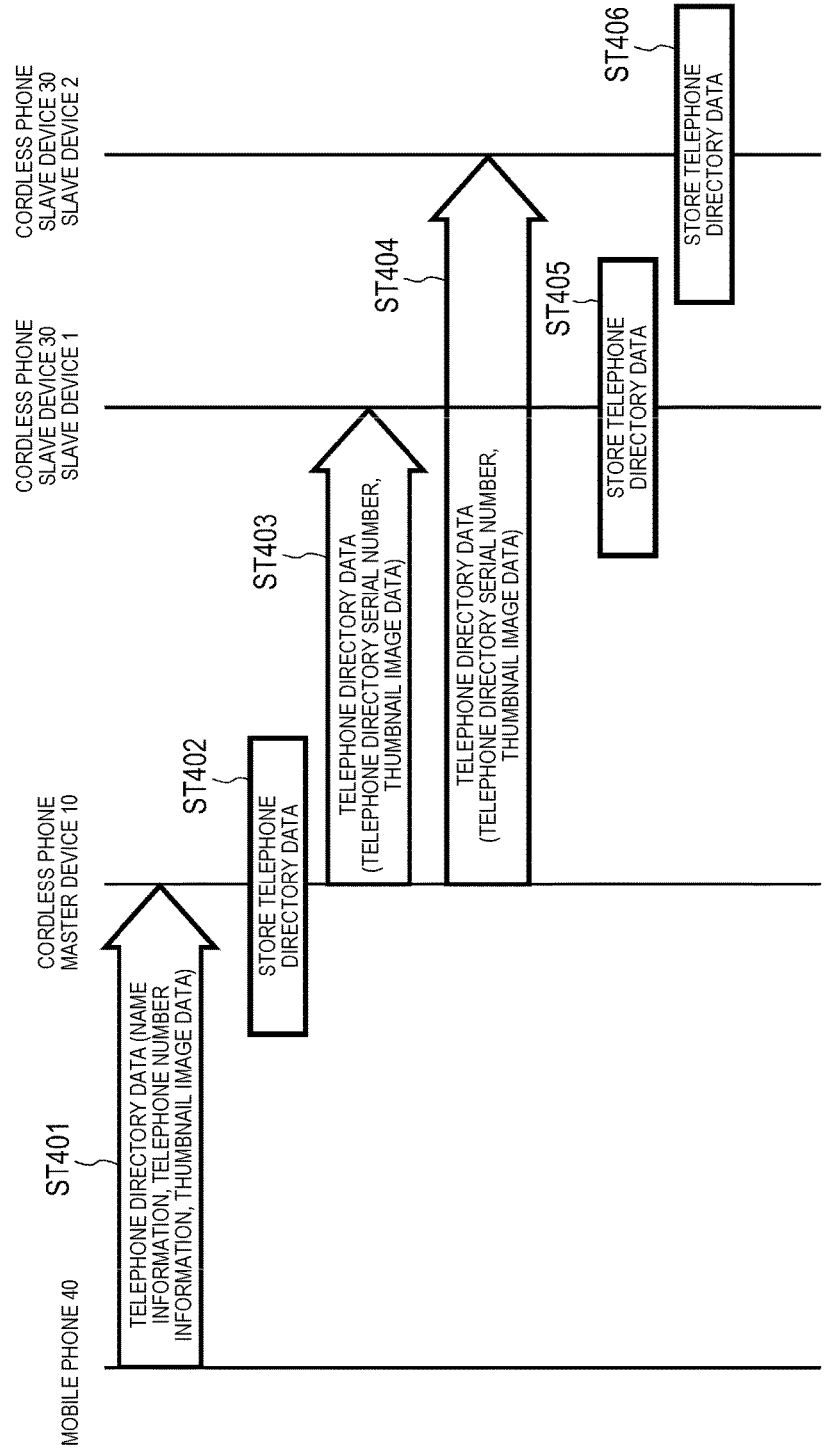
FIG. 10 is a sequence diagram illustrating a processing procedure during data transfer of the telephone directory data.
Figure 11:
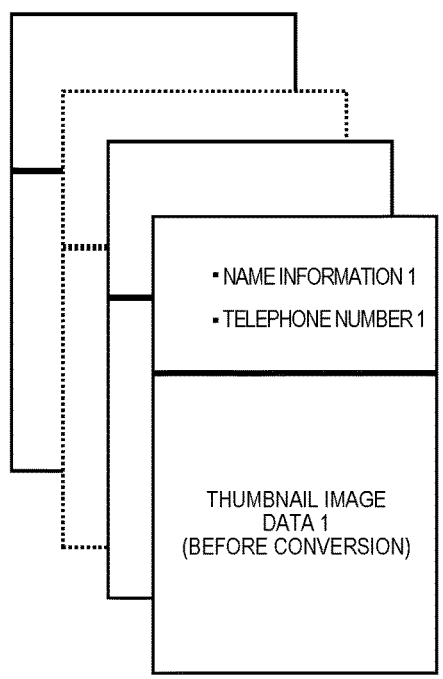
FIG. 11 is a diagram illustrating an example of telephone directory data stored in the mobile phone illustrated in FIG. 4.

Next, a processing procedure of transmitting the telephone directory data including the thumbnail image data from mobile phone 40 to cordless phone master device 10, and placing the telephone directory data in storage unit 131 of cordless phone master device 10 and storage unit 136 of cordless phone slave device 30 will be described with reference to the sequence diagram of FIG. 10. As illustrated in FIG. 11, telephone directory data including a plurality of records is stored in mobile phone 40, with a data set including the name information, the telephone number information, and the thumbnail image data of a communication partner as a single record (a data unit to be managed).

First, in ST401, mobile phone 40 selects the telephone directory data which is associated with the name information, the telephone number information and the thumbnail image data, which are stored in storage unit 142, by using slave device transfer data selecting unit 153, designates slave devices (slave device 1 and slave device 2) which are destinations of the slave device transfer data (telephone directory data) by using the destination slave device selecting unit, and transmits the slave device transfer data (telephone directory data) to cordless phone master device 10.

Next, in ST402, cordless phone master device 10 stores the received telephone directory data in the storage area of the telephone directory data of storage unit 103. In addition, cordless phone master device 10 determines a record into which the data set of the telephone directory data is to be written, by matching the telephone number information of the telephone directory data which is received from mobile phone 40 with the stored telephone number information, on a per record basis. Specifically, if both telephone number information pieces match, the data set is written into the storage area of the matched record; and if they do not match, as a new record, the data set of the telephone directory data received from mobile phone 40 is written into a free record of the telephone directory data of cordless phone master device 10.

Next, in ST403 and ST404, cordless phone master device 10 determines destination slave devices (slave device 1 and slave device 2) of the received slave device transfer data (telephone directory data), through the processes by destination slave device determining unit 123, slave device transfer data conversion unit 124 and slave device transfer data transmitting unit 125. Cordless phone master device 10 performs a size conversion process corresponding to the screen size of the destination slave device on the received thumbnail image data, as necessary, and thereafter, transmits slave device transfer data (telephone directory data) to each cordless phone slave device 30 (slave device 1 and slave device 2).

In addition, the telephone directory serial number (record number) of the telephone directory of cordless phone master device 10 is assigned to the telephone directory data which is transmitted from cordless phone slave device 30 (slave device 1 and slave device 2), in addition to the name information, the telephone number information and the thumbnail image data of all records of the telephone directory data received from mobile phone 40. However, as illustrated in ST403 and ST404 of FIG. 10, cordless phone master device 10 may transmit only the thumbnail image data and the telephone directory serial number (record number) of the telephone directory in which the thumbnail image data is stored.

If the transmission of the telephone directory data to cordless phone slave device 30 is completed, cordless phone master device 10 is able to store the thumbnail image data in storage unit 131 of cordless phone slave device 30, in association with the telephone directory serial number of the telephone directory of cordless phone master device 10, such that cordless phone master device 10 deletes the thumbnail image data stored in storage unit 103, and releases the memory of storage unit 103.

Next, in ST405 and ST406, slave device transfer data receiving units 139 of respective cordless phone slave devices 30 (slave device 1 and slave device 2) store the telephone directory data received from cordless phone master device 10 in storage unit 131.

Figure 12:
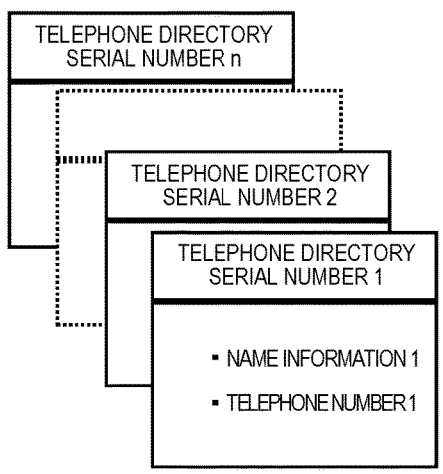
FIG. 12 is a diagram illustrating an example of telephone directory data stored in the cordless phone master device illustrated in FIG. 2.
Figure 13:
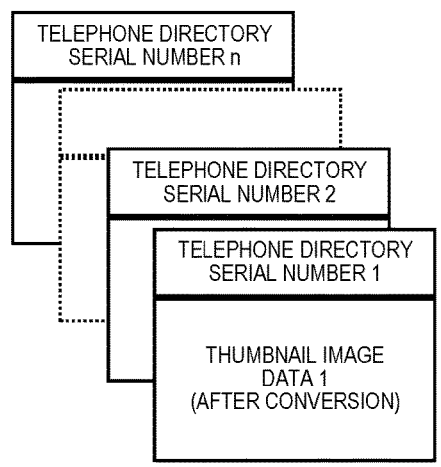
FIG. 13 is a diagram illustrating an example of telephone directory data stored in the cordless phone slave device illustrated in FIG. 3.

As a result, as illustrated in FIG. 12, the telephone directory data which is associated with the telephone directory serial number, the name information and the telephone number information is stored in cordless phone master device 10. As illustrated in FIG. 13, the telephone directory data in which the telephone directory serial number is associated with the thumbnail image data is stored in cordless phone slave device 30.

In this way, in the present exemplary embodiment, since the thumbnail image data that is converted into the size of cordless phone slave device 30 is previously stored in cordless phone slave device 30, every time there is an incoming call, there is no need to perform the conversion and transmission of the thumbnail image data from cordless phone master device 10 to cordless phone slave device 30. Accordingly, it is possible to prevent the occurrence of a delay in operations performed up to display of the telephone directory data including the thumbnail image data on a slave device after there is an incoming call. Since only the telephone directory serial number and the converted thumbnail image data of the telephone directory data are previously stored in cordless phone slave device 30, it is possible to save the storage area, having generally a smaller capacity, of the storage unit of cordless phone slave device 30.

In addition, although in the above exemplary embodiment, a description has been given on a case where after transmitting the telephone directory data to cordless phone slave device 30, cordless phone master device 10 removes thumbnail image data, stores text information including name information and telephone number information in the master device, and stores the thumbnail image data (image data) in the slave device, the present invention is not limited thereto, and cordless phone master device 10 may store the thumbnail image data in both the master device and the slave device, without removing the thumbnail image data, and store the thumbnail image data of the master device as backup and restoration data when the thumbnail image data on the slave device side is lost by mistake.

In addition, in the above exemplary embodiment, a message having the telephone directory serial number (record number) of the telephone directory data of cordless phone master device 10 assigned thereto is transmitted, and thus cordless phone slave device 30 reads and displays the thumbnail image data associated with the telephone directory serial number, but the slave device stores a record including the telephone number information of the telephone directory data and the thumbnail image data, and the master device transmits a message having telephone number information assigned thereto, while a telephone directory serial number is not assigned thereto, the slave device uses the telephone number information of the received message as record identification information, the record of the telephone number information on the slave device side that matches the telephone number information in the received message may be acquired and the thumbnail image data of the record may be displayed on the slave device.

INDUSTRIAL APPLICABILITY

The present invention is suitable for being used in a cordless telephone device including a plurality of slave devices and a master device thereof.

REFERENCE MARKS IN THE DRAWINGS

10 CORDLESS PHONE MASTER DEVICE
20 ACCESS POINT
30 CORDLESS PHONE SLAVE DEVICE
40 MOBILE PHONE
101 NCU AND MODEM UNIT
102 TAM UNIT
103, 131, 142 STORAGE UNIT
104, 132, 143 AUDIO INPUT OUTPUT UNIT
105, 133, 144 OPERATION UNIT
106, 134, 145 LCD UNIT
107 CORDLESS PHONE SLAVE DEVICE WIRELESS I/F UNIT
108 CORDLESS PHONE SLAVE DEVICE CONTROL UNIT
109, 146 WIRELESS LAN I/F UNIT
110 MASTER DEVICE CONTROL UNIT
121, 138 CALL CONTROL UNIT
122, 139 SLAVE DEVICE TRANSFER DATA RECEIVING UNIT
123 DESTINATION SLAVE DEVICE DETERMINING UNIT
124, 155 SLAVE DEVICE TRANSFER DATA CONVERSION UNIT
125 SLAVE DEVICE TRANSFER DATA TRANSMITTING UNIT
135 CORDLESS PHONE MASTER DEVICE WIRELESS I/F UNIT
136 CORDLESS PHONE MASTER DEVICE CONTROL UNIT
137 SLAVE DEVICE CONTROL UNIT
141 CELLULAR WIRELESS I/F UNIT
147 EXTERNAL MEMORY I/F UNIT
148 TERMINAL CONTROL UNIT
151 CELLULAR PHONE CONTROL UNIT
152 WEB BROWSER CONTROL UNIT
153 SLAVE DEVICE TRANSFER DATA SELECTING UNIT
154 DESTINATION SLAVE DEVICE SELECTING UNIT
156 SLAVE DEVICE TRANSFER DATA TRANSMITTING UNIT

The invention claimed is:

1. A cordless telephone system comprising:
a slave device; and
a master device,
wherein the master device includes:
a first storage that stores telephone directory data including a plurality of records, wherein each record is formed of a data set including name information and telephone number information, and
a first call controller which, in operation, transmits a first message to one of the slave devices, the first message including n records where n is an integer greater than 1, out of the plurality of records, to be displayed on the slave device and including record identification information of the n records, and, in response to receiving a next message request from the slave device transmits a second message to the slave device, the second message including another n records to be displayed on the slave device and including record identification information of the another n records, and
wherein the slave device includes:
a second storage that stores thumbnail images respectively associated with the plurality of record identification information of the plurality of records, and
a second call controller which, in response to receiving the first message from the master device, displays n data sets of the n records included in the first message and displays n thumbnail images which are read out from the second storage in reference to the record identification information included in the first message, and, in response to receiving the second message from the master device, displays another n data sets of the another n records included in the second message and displays another n thumbnail images which are read out from the second storage in reference to the record identification information included in the second message, wherein the slave device displays the name information and telephone number information of each of the records included in the first message, and displays each of the thumbnail images read out from the second storage in reference to the record identification information included in the first message in association with the name information and telephone number information of a corresponding one of the records included in the first message, and wherein the slave device displays the name information and telephone number information of each of the records included in second message, and displays each of the thumbnail images read out from the second storage in reference to the record identification information included in the second message in association with the name information and telephone number information of a corresponding one of the records included in the second message.

2. The cordless telephone device of claim 1,
wherein the master device, in response to detecting an incoming call associated with telephone number information, selects a record associated with the telephone number information from the telephone directory data, and transmits a third message including the selected record and the record identification information of the record.

3. The cordless telephone device of claim 1,
wherein the master device, in operation,
  receives the telephone directory data, in which each data set includes name information, telephone number information, and a thumbnail image,
  stores the received telephone directory data in the first storage, and
  transfers the thumbnail images and their corresponding record identification information to the slave device.

4. The cordless telephone device of claim 3,
wherein the master device, after transferring the thumbnail images to the slave device, deletes the thumbnail images from the first storage.

5. The cordless telephone device of claim 3,
wherein the master device, in operation, converts the thumbnail images into a data format usable by the slave device.

6. A cordless telephone system comprising:
a slave device; and
a master device,
wherein the master device, in operation,
  receives telephone directory data including records, wherein each record is formed of a data set including name information, telephone number information, and a thumbnail image,
  stores the received telephone directory data in a first storage, wherein record identification information is assigned to each record,
  transfers the thumbnail images and their corresponding record identification information to the slave device, and
  transmits a first message to the slave device, the first message including n records where n is an integer greater than 1, out of the plurality of records, minus n thumbnail images of the n records, to be displayed on the slave device and including record identification information of the n records, and, in response to receiving a next message request from the slave device transmits a second message to the slave device, the second message including another n records, minus another n thumbnail images of the another n records, to be displayed on the slave device and including record identification information of the another n records, and wherein the slave device, in operation,
  receives the thumbnail images and their corresponding record identification information from the master device, and stores the thumbnail images and their corresponding record identification information in a second storage, and
  in response to receiving the first message from the master device, displays n sets of the name information and the telephone number information included in the first message and displays n thumbnail images which are read out from the second storage in reference to the record identification information included in the first message, and, in response to receiving the second message from the master device, displays another n sets of the name information and the telephone number information included in the second message and displays another n thumbnail images which are read out from the second storage in reference to the record identification information included in the second message, wherein the slave device displays the name information and telephone number information of each of the records included in the first message, and displays each of the thumbnail images read out from the second storage in reference to the record identification information included in the first message in association with the name information and telephone number information of a corresponding one of the records included in the first message, and wherein the slave device displays the name information and telephone number information of each of the records included in second message, and displays each of the thumbnail images read out from the second storage in reference to the record identification information included in the second message in association with the name information and telephone number information of a corresponding one of the records included in the second message.

7. A telephone directory control method of a cordless telephone system which includes at least one slave device and a master device, wherein a telephone directory includes a plurality of records, each record including name information, telephone number information, and a thumbnail image, the telephone directory control method comprising:
  storing a plurality of data sets in the master device, each data set including the name information and the telephone number information of a record;
  storing a plurality of record identification information and a plurality of the thumbnail images of the plurality of records in the slave device;
  transmitting a first message from the master device to the slave device, the first message including n data sets where n is an integer greater than 1, out of the plurality of data sets, to be displayed on the slave device and including record identification information of the n data sets;

displaying on the slave device the n data sets included in the first message and n thumbnail images which are read out from the slave device in reference to the record identification information included in the first message;

transmitting a second message from the master device to the slave device, the second message including another n data sets, out of the plurality of data sets, to be displayed on the slave device and including record identification information of the another n data sets; and displaying on the slave device the another n data sets included in the second message and another n thumbnail images which are read out from the slave device in reference to the record identification information included in the second message, wherein the slave device displays the name information and telephone number information of each of the records included in the first message, and displays each of the thumbnail images read out from the second storage in reference to the record identification information included in the first message in association with the name information and telephone number information of a corresponding one of the records included in the first message, and wherein the slave device displays the name information and telephone number information of each of the records included in second message, and displays each of the thumbnail images read out from the second storage in reference to the record identification information included in the second message in association with the name information and telephone number information of a corresponding one of the records included in the second message.

8. The telephone directory control method of claim 7, wherein the master device is connected to a wireless access point, and also is connected to a fixed telephone network.

9. The cordless telephone system of claim 6, wherein the master device is connected to a wireless access point, and also is connected to a fixed telephone network.

10. The cordless telephone device of claim 1, wherein the master device is connected to a wireless access point, and also is connected to a fixed telephone network.

* * * * *